US012103261B2

(12) United States Patent
Monti

(10) Patent No.: US 12,103,261 B2
(45) Date of Patent: Oct. 1, 2024

(54) APPARATUS FOR COLLECTING A TUBULAR BOX IN A FLATTENED CONFIGURATION FROM A STORE, FOR OPENING OUT THE TUBULAR BOX AND FOR TRANSFERRING THE BOX TO A RECEIVING STATION

(71) Applicant: MARCHESINI GROUP S.p.A., Pianoro (IT)

(72) Inventor: Giuseppe Monti, Pianoro (IT)

(73) Assignee: Marchesini Group S.P.A. (IT)

( * ) Notice: Subject to any disclaimer, the term of this patent is extended or adjusted under 35 U.S.C. 154(b) by 0 days.

(21) Appl. No.: 18/025,154

(22) PCT Filed: Sep. 20, 2021

(86) PCT No.: PCT/IB2021/058539
§ 371 (c)(1),
(2) Date: Mar. 7, 2023

(87) PCT Pub. No.: WO2022/064345
PCT Pub. Date: Mar. 31, 2022

(65) Prior Publication Data

US 2023/0321940 A1 Oct. 12, 2023

(30) Foreign Application Priority Data

Sep. 23, 2020 (IT) ........................ 102020000022381

(51) Int. Cl.
*B31B 50/80* (2017.01)
*B31B 50/06* (2017.01)
(Continued)

(52) U.S. Cl.
CPC .......... *B31B 50/804* (2017.08); *B31B 50/062* (2017.08); *B65B 43/185* (2013.01);
(Continued)

(58) Field of Classification Search
CPC . B31B 50/804; B31B 50/062; B31B 2110/35; B31B 2120/302; B31B 50/80;
(Continued)

(56) References Cited

U.S. PATENT DOCUMENTS 3,293,998 A * 12/1966 Farnow ................ B65B 43/305 414/737
4,066,009 A * 1/1978 Calvert ................ B65B 43/285 493/310

(Continued)

FOREIGN PATENT DOCUMENTS

| | | | |
|---|---|---|---|
| EP | 2094479 | A1 | 9/2009 |
| EP | 2617561 | A1 | 7/2013 |
| WO | WO2008/047008 | | 4/2008 |

*Primary Examiner* — Thomas M Wittenschlaeger
*Assistant Examiner* — Katie L Gerth
(74) *Attorney, Agent, or Firm* — Endurance Law Group PLC

(57) ABSTRACT

An apparatus for use in the packaging industry comprises a first member for collecting a tubular box in a flattened configuration from a store positions the tubular box in a lowered position, retaining the box with first suction means at a first wall of the box. A second member, a third member and a fourth member are provided for movement of a fifth member which, when activated in rotation, abuts and retains, via second suction means a second wall of the tubular box, causing it to rotate with respect to the first wall, to open out the tubular box. A sixth member is included, with third suction means which is moved by a system to abut and retain the box in the opened-out configuration and transfer it, following the disengagement of the first member and of the fifth member, at a receiving station.

6 Claims, 9 Drawing Sheets

(51) Int. Cl.
*B31B 110/35* (2017.01)
*B31B 120/30* (2017.01)
*B65B 43/18* (2006.01)
*B65B 43/30* (2006.01)

(52) U.S. Cl.
CPC ......... *B65B 43/305* (2013.01); *B31B 2110/35* (2017.08); *B31B 2120/302* (2017.08)

(58) Field of Classification Search
CPC ....... B31B 50/106; B31B 50/12; B31B 50/74; B65B 43/185; B65B 43/305; B65B 43/285
See application file for complete search history.

(56) References Cited

U.S. PATENT DOCUMENTS

| | | | | | |
|---|---|---|---|---|---|
| 4,629,446 | A * | 12/1986 | Focke | B31B 50/81 | 493/317 |
| 5,120,293 | A * | 6/1992 | Franklin | B31B 50/80 | 493/183 |
| 5,298,008 | A * | 3/1994 | Decker | B31B 50/80 | 493/317 |
| 7,316,642 | B2 * | 1/2008 | Martelli | B65B 43/305 | 493/309 |
| 8,277,367 | B2 * | 10/2012 | Jannin | B65H 3/0808 | 493/309 |
| 9,108,756 | B2 * | 8/2015 | Monti | B65B 43/265 | |
| 9,284,076 | B2 * | 3/2016 | Monti | B65B 43/285 | |
| 9,688,430 | B2 * | 6/2017 | Zambelli | B65B 43/325 | |
| 10,011,379 | B2 * | 7/2018 | Baltes | B65B 43/185 | |
| 10,472,108 | B2 * | 11/2019 | Iwasa | B31B 50/006 | |
| 10,850,881 | B2 * | 12/2020 | Langen | B65B 43/305 | |
| 2008/0300123 | A1 * | 12/2008 | Bonnain | B65B 43/265 | 493/310 |
| 2009/0264269 | A1 * | 10/2009 | Monti | B65B 43/345 | 493/52 |
| 2013/0186043 | A1 * | 7/2013 | Monti | B65B 43/285 | 53/381.1 |
| 2023/0321940 | A1 * | 10/2023 | Monti | B65B 43/305 | 493/315 |

* cited by examiner

APPARATUS FOR COLLECTING A TUBULAR BOX IN A FLATTENED CONFIGURATION FROM A STORE, FOR OPENING OUT THE TUBULAR BOX AND FOR TRANSFERRING THE BOX TO A RECEIVING STATION

FIELD OF THE INVENTION

The present invention relates to the technical sector concerning the packaging of products, such as for example portions of blister strips containing tablets, capsules and the like (blister packs) inside relative tubular boxes.

In particular, the present invention relates to an apparatus which is configured to carry out a pick-up of a tubular box, in a flattened configuration from a store, for opening out the tubular box and for transfer thereof, opened out, to a receiving station.

In the receiving station, operations, for example, of product insertion can take place, such as for example of blister packs, internally of the box, or other operations of handling or transfer of the opened-out tubular box.

Tubular boxes are constituted by tubular die-cut blanks made of cardboard which are initially in a flattened configuration, to enable optimal storing in relative stores.

The tubular boxes in the flattened configuration, once collected from the relative store, must be opened out to be able to receive products internally thereof, such as for example blister packs, and the to be closed.

A tubular box in the flattened configuration comprises a first sheet and a second sheet which are in contact with one another or very close to one another; the first sheet and the second sheet are connected to one another at the relative opposite ends.

The first sheet is provided with a first wall and a second wall which are separated from one another by a first fold line; likewise, the second sheet is provided with a third wall and a fourth wall which are separated from one another by a second fold line.

Also included are closing flaps of the tubular box at the heads thereof.

DESCRIPTION OF THE PRIOR ART

Document EP 2 617 561, in the name of the same Applicant, describes an apparatus for collecting a tubular box in a flattened configuration from a store, for opening out the tubular box and for transfer thereof to a receiving station according to the preamble of claim 1.

The apparatus (1) described in this document is illustrated in FIGS. 1A, 1B and 1C in which it is illustrated in various possible operating configurations, which represent various pick-up steps of a tubular box (2) in a flattened configuration from a store (15), for opening out the tubular box and transferring the box to a receiving station (R).

For example, the receiving station (R) can be constituted by a conveyor (3) (of known type) having two chains which bear the drawing elements (4), spaced from one another, to receive there-between and transport a tubular box (2) once opened out.

As already specified, a tubular box (2) in a flattened configuration comprises a first sheet (6) and a second sheet (7) which are in contact with one another or very close to one another; the first sheet (6) is connected to the second sheet (7) at two common and opposite ends.

The first sheet (6) is provided with a first wall (8) and a second wall (9) which are separated from one another by a first fold line (11); likewise, the second sheet (7) is provided with a third wall (12) and a fourth wall (13) which are separated from one another by a second fold line (14) (see for example FIG. 1B).

The tubular box (2) further comprises closing flaps (not visible in FIGS. 1A, 1B and 1C) of the heads of the tubular box (2) once opened-out.

The tubular boxes (2) in a flattened configuration are arranged stocked on one another internally of a store (15) which is located in proximity, and above, the receiving station (R).

For example, the store (15) is arranged in such a way as to be arranged inclined with the relative outlet (U), from which the tubular boxes (2) are collected in the flattened configuration, which is inclined with respect to a horizontal plane.

The apparatus (1) described in above-mentioned document EP 2 617 561 is positioned in the vicinity of the receiving station (R) and the outlet (U) of the store (15). The apparatus 1 comprises:

- a frame (10);
- a first member (21), provided with first suction means (17) (for example constituted by aspirating suction cups), which is hinged to the frame (10) according to a first rotation axis (31), in a position below the outlet (U) of the store (15), so as to be activatable in rotation about the first rotation axis (31), between a raised position (not illustrated in detail in FIGS. 1A, 1B, 1C), wherein the first suction means (17) are at the outlet (U) of the store (15), and a lowered position (P) (see FIG. 1A) facing the receiving station (R);
- a second member (22) which is hinged to the frame (10) at a second rotation axis (32);
- a third member (23) which is hinged to the frame (10) at a third rotation axis, coinciding with the first rotation axis (31) of the first member (21);
- a fourth member (24) which is hinged, by a first end portion (24A), to the second member (22) at a fourth rotation axis (34) and which is hinged, at an intermediate portion (24B), to the third member (23) at a fifth rotation axis (35);
- a fifth member (25), provided with second suction means (18) (for example constituted by aspirating suction cups), which is hinged to a second end portion (24C) of the fourth member (24) at a sixth rotation axis (36), so as to be activatable in rotation about the sixth rotation axis (36), with respect to the fourth member (24).

The second member (22), the third member (23), the fourth member (24) and the frame (10) substantially identify a four bar linkage for the movement of the fifth member (25), moving towards or away from the receiving station (R).

The apparatus (1) is configured in such a way that the first member (21) can be made to rotate, in a first rotation direction about the first rotation axis (31), in order to be positioned in the raised position the such a way that the first suction means (17) can pick up, and retain, by suction, a tubular box (2) in a flattened configuration from the outlet (U) of the store (15), and then be rotated in an opposite second rotation direction in order to take the tubular box (2) in the flattened configuration into the lowered position (P), for folding, where it is to be opened-out (FIG. 1A).

The tubular box (2) in a flattened configuration is picked up and retained by the first suction means (17) at the first wall (8) of the first sheet (6).

During these operations, the fifth member (25) is positionable in a position (M) such that the second suction means

(18) are situated upstream of the first suction means (17), with respect to the receiving station (R), when the first member (21) is brought into the lowered position (P) (see FIG. 1A again).

The apparatus (1) is further configured in such a way that, when the tubular box (2) is in the flattened configuration, has been brought into the lowered position (P), and retained by the first suction means (17) of the first member (21), the fifth member (25) is activatable in rotation about the sixth rotation axis (36), with respect to the fourth member (24), in such a way as to bring the second suction means (18) to strike, and retain, by suction, the second wall (9) of the first sheet (6) of the tubular box (2) in the flattened configuration.

Then, the first member (21) and the fifth member (25) are activatable in rotation about the relative rotation axes to rotate the first wall (8) with respect to the second wall (9) about the relative fold line (11), for opening out the tubular box (see FIG. 1B).

At this point, following the deactivation of the first suction means (17), the first member (21) can be further rotated to disengage from the opened-out tubular box (2) and thus the fifth member (25), with the second suction means (18) which retain the opened-out tubular box (2), can be moved (by the activation of the second member (22) and the third member (23) in rotation with respect to the rotation axes thereof, which determines the movement, arrow (F) in FIG. 1C, of the fourth member (24) towards the receiving station) to the receiving station (R) and thus release the tubular box (2) opened-out between the drawing elements (4) of the conveyor once the second suction means (18) has been deactivated (FIG. 1C).

The apparatus has been shown to be effective and extremely functional in carrying out the pick-up and opening of the tubular boxes, as is the transfer thereof to the receiving station, i.e. at the inlet of the conveyor.

However, in cases where the tubular boxes have large dimensions, for example with the sides of the quadrilateral that is formed when the sides are opened out being larger than 90 mm and up to even 110 and 165, performance levels fall, as the time necessary for carrying out the pick-up of a box, opening it out and transferring it to the receiving station requires a longer time.

In fact, firstly, in the lowered position, given the larger size of the box, an adequate space must be guaranteed for enabling the rotations of the first member (21) and fifth member (25) for the opening out of the box.

This means that the position in which the first member (25) must be positioned with the second suction means (18) upstream of the first suction means (17) of the first member (21), when it is brought into the lowered position (P), is more distant from the receiving station with respect to the cases in which the tubular boxes have smaller dimensions.

Consequently, once the tubular box is opened-out, and the first suction means (17) have been disengaged therefrom, the first member (25) must carry out a larger run to bring the opened-out tubular box to the receiving station (R), for example between the elongate elements (4) of the conveyor (3).

This leads to a longer and non-operational waiting time for the first member (21), which must wait for the return of the second member (25) into the initial position upstream before being ready to activate to pick up a next tubular box in flattened configuration from the outlet of the store and to position it at the lowered position (P). Consequently the frequency of pick-up, opening and transfer of the boxes to the receiving station will be lower, with negative repercussions on productivity.

SUMMARY OF THE INVENTION

The aim of the present invention is therefor to provide a new improved apparatus for collecting a tubular box in a flattened configuration from a store, for opening out the tubular box and for transferring the box to a receiving station, able to obviate the above-mentioned drawbacks.

In particular, an aim of the present invention is to provide an improved apparatus able to ensure high productivity, as well as an efficient pick-up, opening out and transfer of the boxes, also in all those cases where the tubular boxes have large dimensions.

The above aims are attained with an apparatus for collecting a tubular box in a flattened configuration from a store, for opening out the tubular box and for transfer thereof to a receiving station according to the contents of the claims.

BRIEF DESCRIPTION OF THE DRAWINGS

A preferred, but not exclusive, embodiment of the apparatus of the invention will be described in the following description with reference to the appended tables of drawings, in which.

Figure 1A:
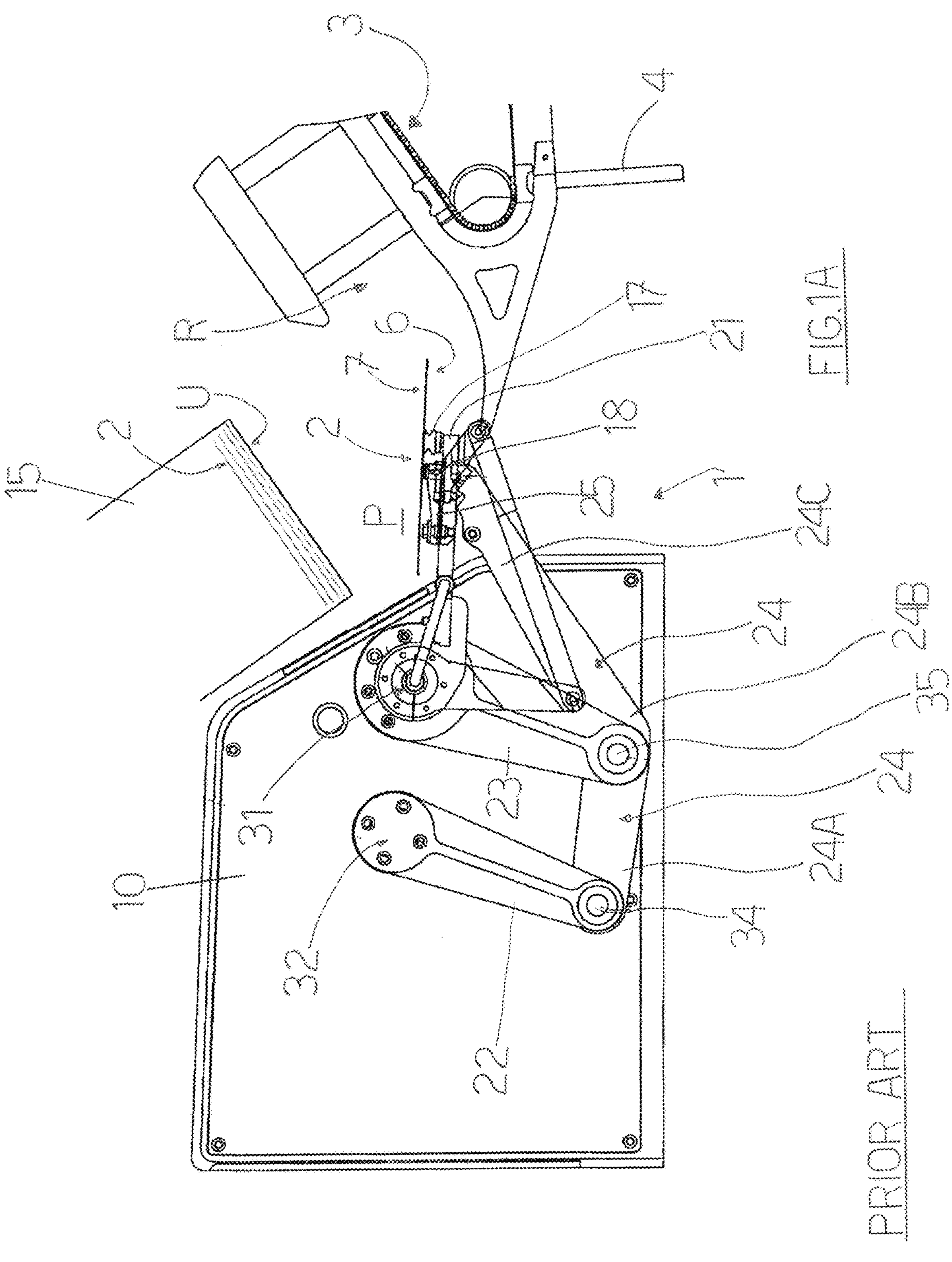
FIG.1A PRIOR ART
FIGS. 1A, 1B and 1C illustrate, in respective lateral views in various operational configurations, an apparatus for collecting a tubular box in a flattened configuration, for opening out the tubular box and for transfer thereof to a receiving station which is described in document EP 2 617 561, in the name of the same Applicant.
Figure 1B:
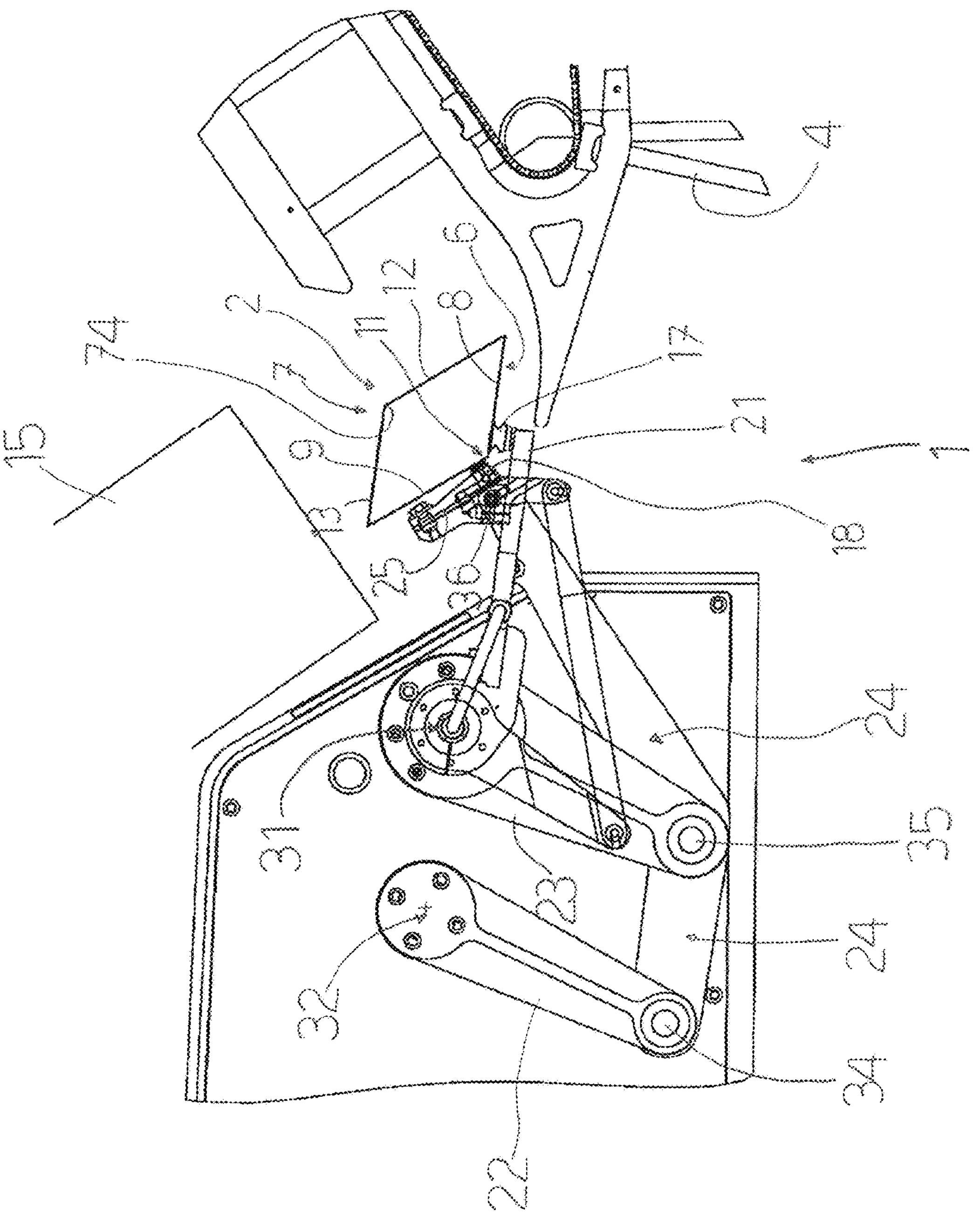
FIG.1B PRIOR ART
Figure 1C:
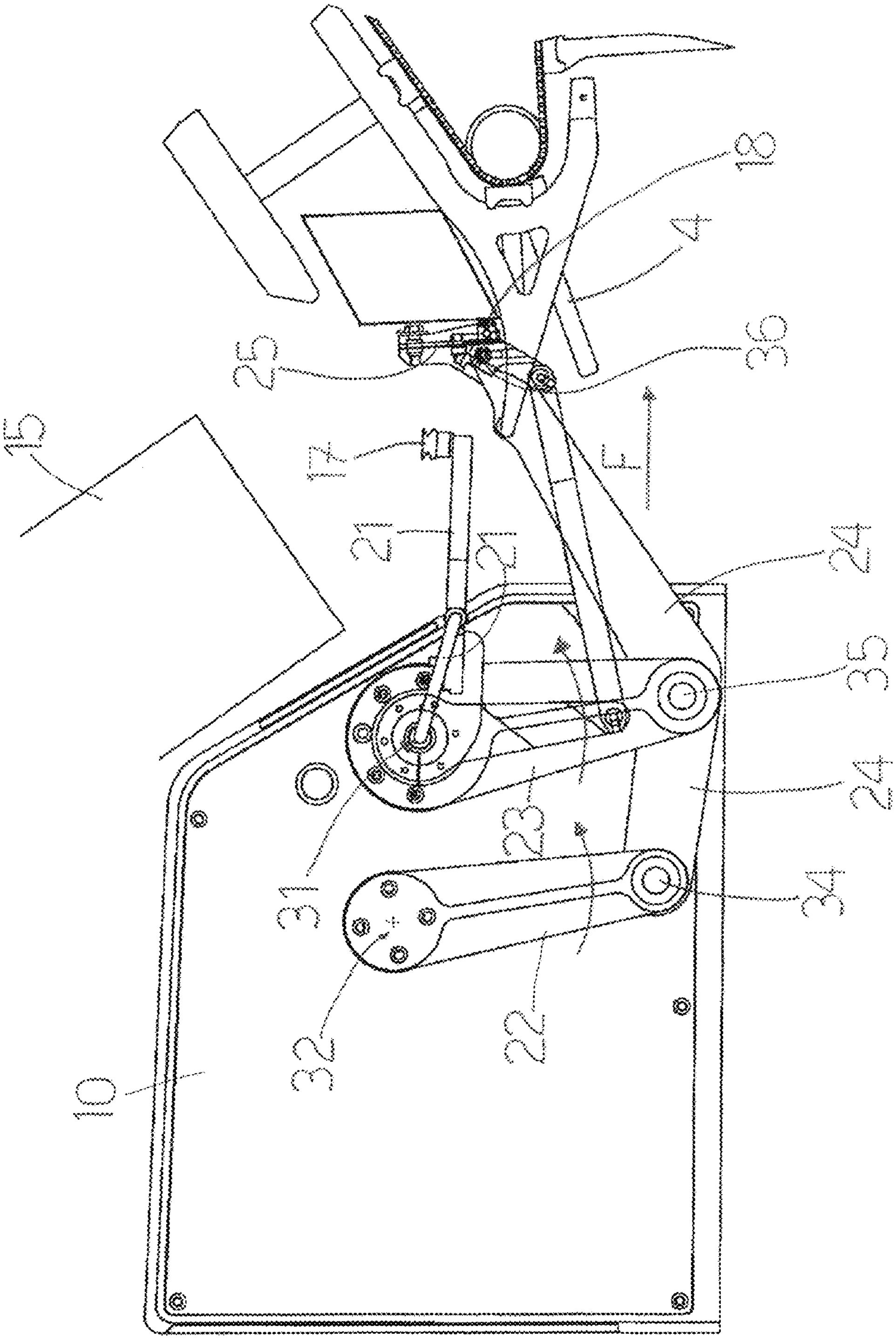
FIG. 1C PRIOR ART

figures from 3 to 7 illustrate, in respective lateral schematic views, the apparatus of the invention in successive and diverse operating pick-up configurations of a tubular box in a flattened configuration from the store, for opening out the tubular box and for transferring the opened-out tubular box to a receiving station.

DESCRIPTION OF THE PREFERRED EMBODIMENTS

With reference to the appended tables of drawings, reference numeral (100) denotes the apparatus for picking up a tubular box in a flattened configuration from a store, for opening out the tubular box and for transferring the opened-out tubular box to a receiving station, object of the present invention, in its entirety.

The tubular boxes (2) in a flattened configuration are arranged stocked on one another internally of store (15) which is arranged in such a way that the relative outlet (U), from which, time by time, the single boxes are to be collected so as to be opened out, is arranged inclined with respect to a horizontal plane.

The store (15) is arranged at a greater height with respect to a receiving station (R) to which the tubular boxes (2) are to be transferred once opened out.

The receiving station (R), such as for example illustrated in the FIGS. from 3 to 7, can be constituted by a chain conveyor means (3) provided with drawing elements (4) which are reciprocally spaced so as to be able to pick up and retain there-between an opened-out tubular box, for transport thereof to successive work stations directed, for example, to carry out insertion of products, such as blister packs, internally thereof.

The tubular box (2) in a flattened configuration is configured in such a way as to comprise a first sheet (6) and a second sheet (7) which are in contact with one another or very close to one another.

The first sheet (6) and the second sheet (7) are connected to one another at the two common and opposite ends.

The first sheet (6) comprises a first wall (8) and a second wall (9) which are separated from one another by a first fold line (11).

The second sheet (7) comprises a third wall (12) and a fourth wall (13) which are separated from one another by a second fold line (14).

The tubular boxes (2) in the flattened configuration are for example arranged internally of the store (15), stacked on one another, so that the first sheet (6), and thus the first wall (8) and the second wall (9), are facing downwards.

The apparatus (100) of the present invention has the following characteristics, in common with the apparatus described in document EP 2 617 561, and which are included in the preamble to claim 1.

It comprises:

a frame (50);

a first member (51), provided with first suction means (510) (for example suction cups connected to an aspiration source), which is hinged to the frame (10) according to a first rotation axis (61), in a position below the outlet (U) of the store (15);

a second member (52) which is hinged to the frame (50) at a second rotation axis (62);

a third member (53) which is hinged to the frame (50) at a third rotation axis, coinciding with the first rotation axis (61) of the first member (51);

a fourth member (54) which is hinged, by a first end portion (54A), to the second member (52) at a fourth rotation axis (64) and which is hinged, at an intermediate portion (54B), to the third member (53) at a fifth rotation axis (65);

a fifth member (55), provided with second suction means (550) (for example suction cups connected to an aspiration source), which is hinged to a second end portion (54C) of the fourth member (54) at a sixth rotation axis (66), so as to be activatable in rotation about the sixth rotation axis (66), with respect to the fourth member (54).

Figure 3:
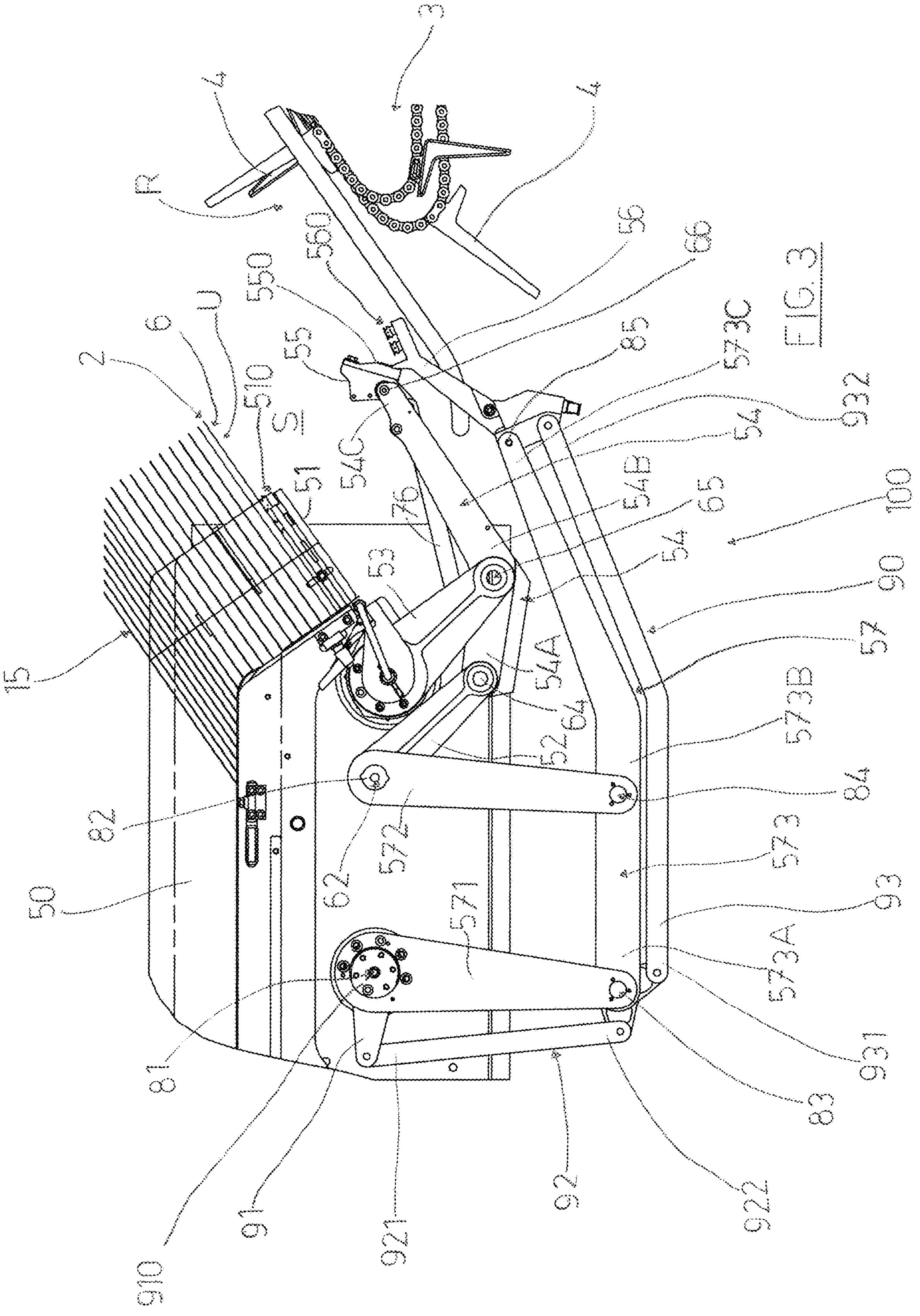

The apparatus (100) is configured in such a way that the first member (51) is activatable in rotation (for example by means of a motor means borne by the frame (50) and not visible in the figures), in a first rotation direction (anticlockwise direction in the figures) about the first rotation axis (61), so as to be positioned in a raised position (S) in such a way that the first suction means (510) can abut a tubular box (2) in flattened configuration at the outlet (U) of the store (15), and retain the tubular box (2) by suction at the first wall (8) of the first sheet (6) (see for example FIG. 3).

Figure 4:
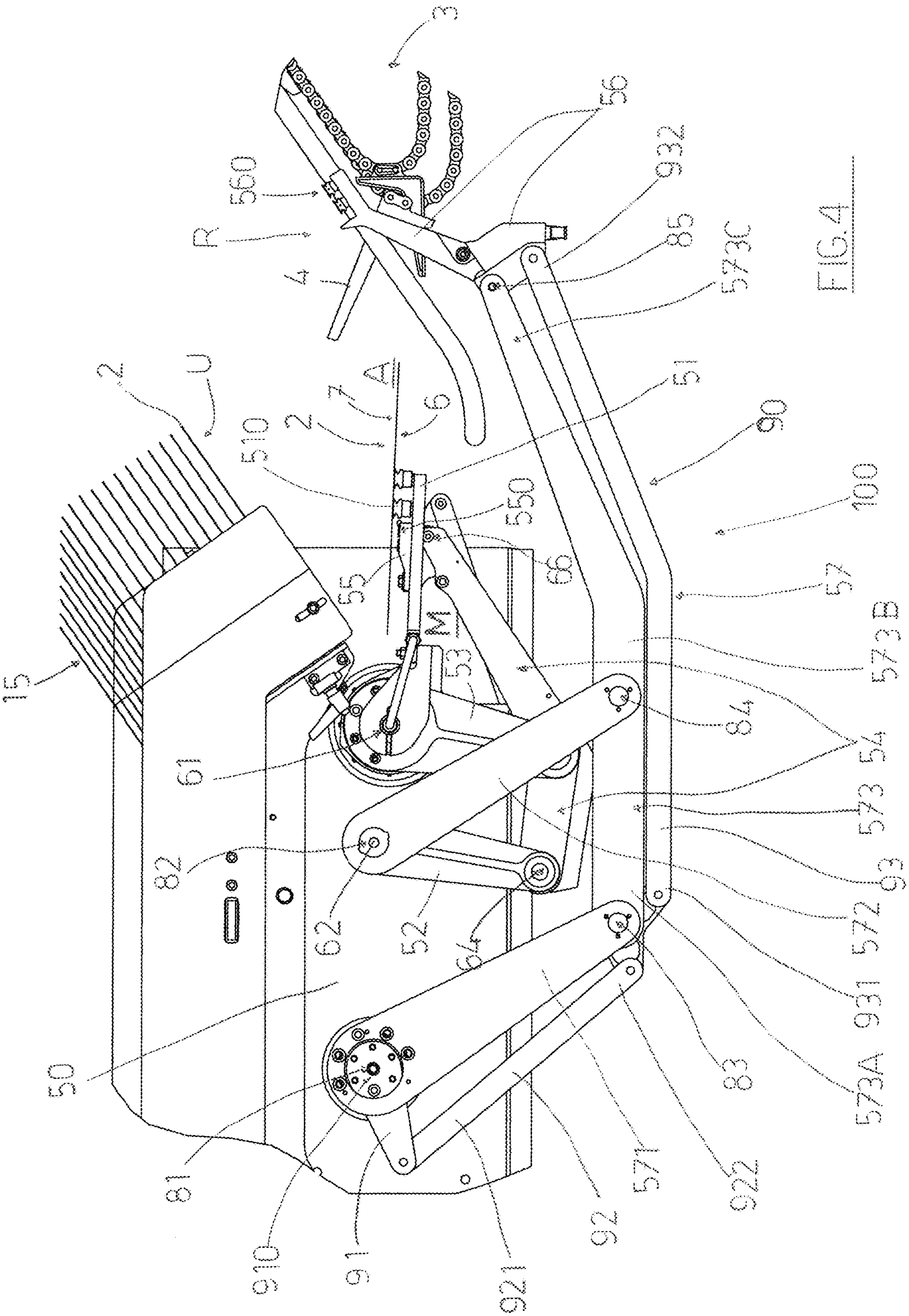

The first member (51) is further activatable in rotation in an opposite second rotation direction (clockwise in the figures) in order to extract the tubular box (2) in the flattened configuration from the store (15) and in order to bring the tubular box (2) in the flattened configuration into a lowered position (A) facing the receiving station (R) in which the tubular box (2) in the flattened configuration is retained by the first suction means (510) (situation is illustrated in FIG. 4).

The second member (52), the third member (53), the fourth member (54) and the frame (50) form a four bar linkage for the movement of the fifth member (55).

In this regard, the apparatus (100) is configured in such a way that the fifth member (55) is positionable (by the rotation of the second member (52) and the third member (53) about the relative rotation axes, and thus by means of the displacement of the fourth member (54)) in a position such that the second suction means (550) are situated upstream of the first suction means (510) of the first member (51), with respect to the receiving station (R), when the first member (51) brings the tubular box (2) in the flattened configuration into the lowered position (A), and inferiorly of the tubular box (2) in the flattened configuration (see once more the configuration illustrated in FIG. 4).

Thus, the fifth member (55), when the tubular box (2) in the flattened configuration has been brought into the lowered position (A), and retained by the first suction means (510) of the first member (51), is activatable in rotation (by means of a relative motor means borne by the frame and not visible in the figures) about the sixth rotation axis (36), with respect to the fourth member (24), in such a way as to bring the second suction means (550) to strike, and retain, by suction, the second wall (9) of the first sheet (6) of the tubular box (2) and rotate the second wall (9) with respect to the first wall (8) about the relative fold line (11), for opening out the tubular box (2).

Figure 5:
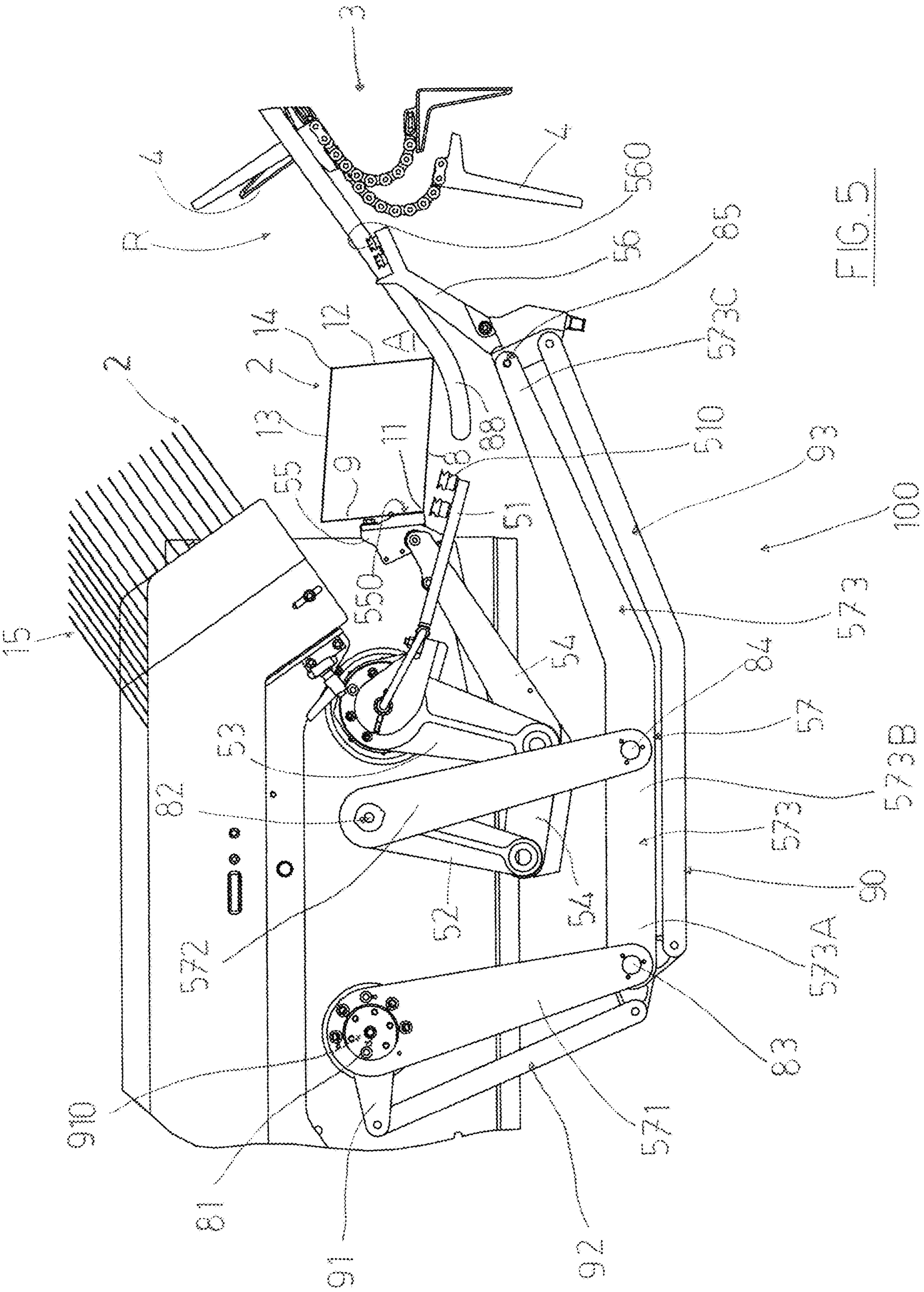

Further, the fifth member (55) is configured to retain via the second suction means (550) the opened-out tubular box (2) following the deactivation of the first suction means (510) and a rotation of the first member (51) (anticlockwise direction in the figures) in order to disengage from the opened-out tubular box (2) (situation illustrated in FIG. 5).

Figure 2:
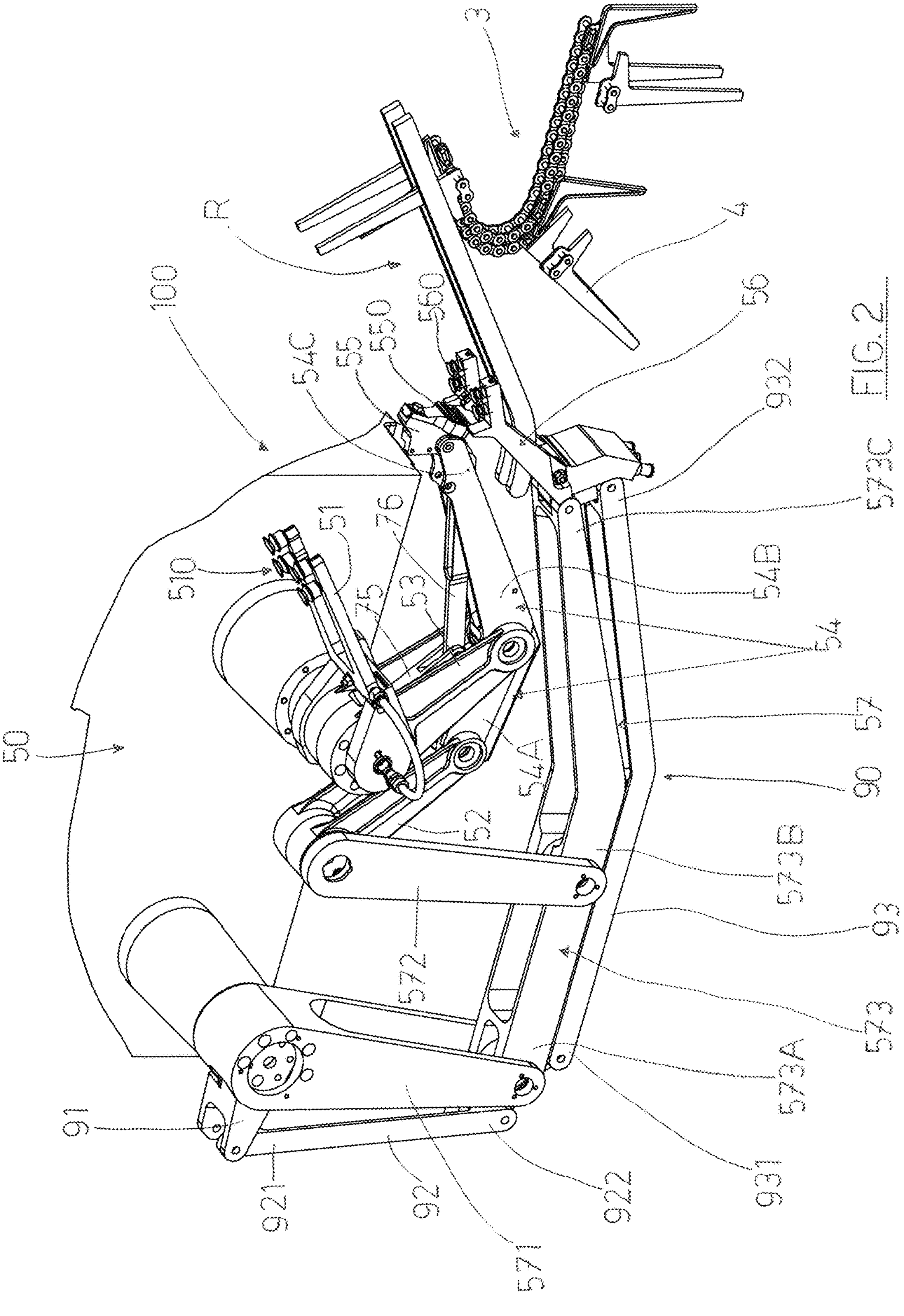
FIG. 2 illustrates, schematically and in a perspective view, the improved apparatus proposed by the invention, for collecting a tubular box in a flattened configuration from a store, for opening out the tubular box and for transferring the box to a receiving station.

The special and novel characteristics of the apparatus (100) of the present invention consist in the fact that it further comprises a sixth member (56), provided with third suction means (560) (for example suction cups connected to an aspiration source), and a movement system (57) of the sixth member (56) (see for example FIG. 2).

Figure 6:
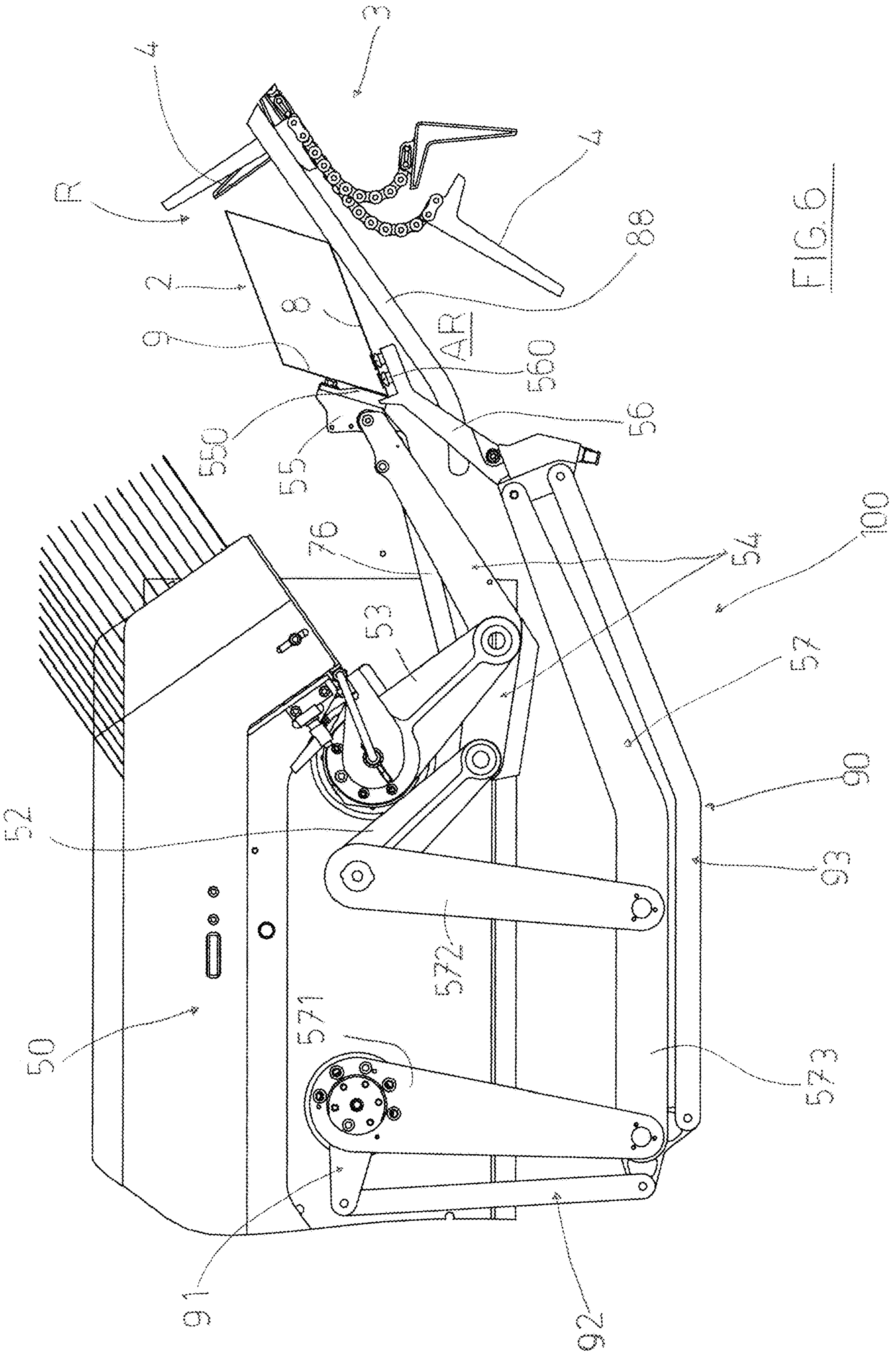

In particular, the apparatus (100) of the invention is such that the movement system (57) is configured and predisposed in such a way as to move and position the sixth member (56) in a first retracted position (AR), in proximity of the lowered position (A), at which the third suction means (560) can abut, and retain, by suction, a wall of the opened-out tubular box (2) which is retained by the second suction means (550) of the fifth member (55) following the deactivation of the first suction means (510) and the disengagement of the first member (51) from the tubular box (2), (see FIG. 6).

Figure 7:
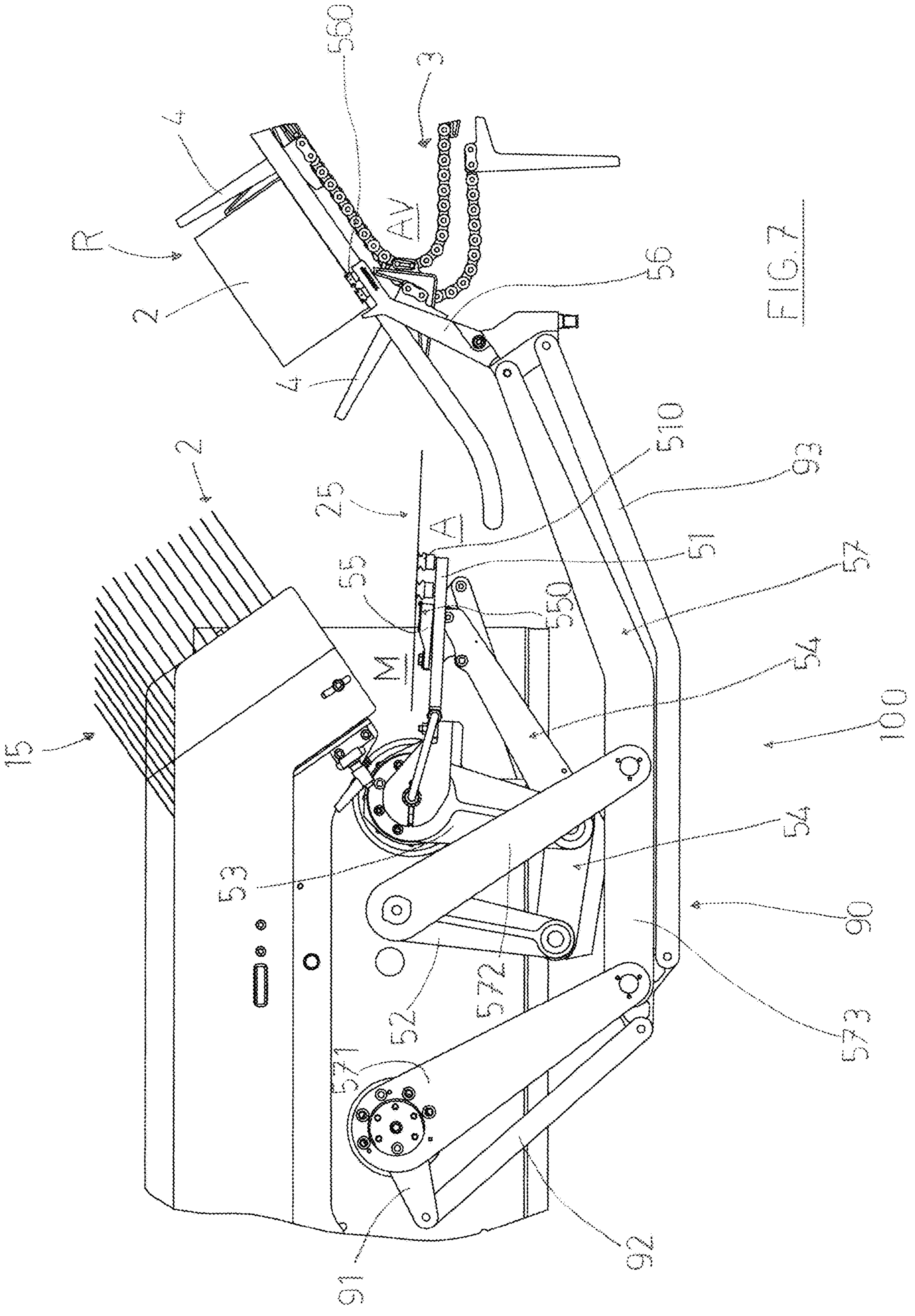

The movement system (57) is also configured and predisposed, following the deactivation of the second suction means (555) and the disengagement of the fifth member (55) from the opened-out tubular box (2), to move and position the sixth member (56), with the third suction means (560) retaining the opened-out tubular box (2) by suction, into a second advanced position (AV) at the receiving station (R) so that the opened-out tubular box (2) can be transferred to and released in the receiving station (R) following the deactivation of the third suction means (560) (see FIG. 7).

In this way, owing to these particularities, with the apparatus (100) of the invention the transfer and positioning of the opened-out tubular box (2) in the receiving station (R) (for example between the elongate elements (4) of the chain conveyor means (3)) is carried out by means of the sixth member (56).

This enables, while the opened-out tubular box is transferred and positioned in the receiving station (R) by means of the movement of the sixth member (56), repositioning the fifth member (55) in the initial position (M) upstream of the lowered position (A) and the first member (51) to be activated for picking up, from the outlet (U) of the store (15), a successive tubular box (2S) in flat configuration and positioning it in the lowered position (A).

See for example FIG. 7, in which the above-described situation has been described, with the sixth member (56) having reached the second advanced position (AV) at the receiving station (R), in order to release the opened-out tubular box (2), while the first member (51) has already picked up and positioned a subsequent tubular box (2) in the flattened configuration in the lowered position (A) and the fifth member (55), in the meantime brought into the upstream position (M) thereof, is ready to be activated for opening out the tubular box (2S).

According to circumstances, and also the possible dimensions that the tubular boxes can have once opened out, the apparatus of the invention can be configured in the following manner.

The fifth member (55), once the tubular box (2) has been opened-out into the lowered position (A) and the first member (51) has disengaged from the opened-out tubular box (2), can be moved (by the rotation of the second arm (52) and the third arm (53), in an anticlockwise direction looking at the figures, about the relative rotation axes, and thus by the movement of the fourth arm (54) towards the receiving station) towards the receiving station (R) and thus can accompany the opened-out tubular box (2), which has in the meantime been collected by the sixth member (56), during a part of the displacement trajectory of the sixth member (56) from the first retracted position (AR) to the second advanced position (AV) thereof (see for example FIG. 6).

In this regard, the apparatus (100) can comprise an abutment element (88), positioned between the lowered position (A), in which the box is opened-out, and the receiving station (R), against which the tubular box once opened-out is taken by the fifth member (55) (see FIG. 5), in order to keep it in the opened-out condition during transfer thereof towards the first retracted position (AR) of the sixth member (56) at which the third suction means (560) of the sixth member (56) can abut, and retain, by suction, a wall of the opened-out tubular box, and carry out the delivery of the opened-out tubular box (2) from the fifth member (55) to the sixth member (56), for the subsequent transfer and positioning thereof in the receiving station (R) (FIG. 6).

For example, the sixth member (56) is configured and positioned so that the third suction means (560) can abut, and retain, by suction, the first wall (8) of the first sheet (6) of the opened-out box.

Thus, even in a case of tubular boxes which, once opened out, have large dimensions, with the apparatus of the invention it is possible to carry out the pick-up, opening and transfer operations of the boxes at a high frequency and therefore deliver high productivity, as the transfer and release operations of the opened-out boxes are carried out by the sixth member, and therefore, in the meantime, the first member can be activated to pick up and position a subsequent tubular box in the flattened configuration in the lowered position for the opening-out thereof.

Further advantageous aspects of the apparatus of the present invention are described in the following.

The movement system (57) of the sixth member (56) preferably comprises: a first arm (571) which is hinged to the frame (50) according to a seventh rotation axis (81); —a second arm (572) which is hinged to the frame (50) according to an eighth rotation axis (82); a third arm (573) which is conformed in such a way as to comprise a first end portion (573A), a second intermediate portion (573B) and a third end portion (573C), wherein the third arm (573) is hinged, with the first end portion (573A) thereof, to the first arm (571) according to a ninth rotation axis (83) and is hinged with the second intermediate portion (573B) to the second arm (82) according to a tenth rotation axis (84), with the sixth member (56) being hinged to the third end portion (573C) of the third arm at an eleventh rotation axis (85).

With this configuration, the rotation of the first arm (571) and the second arm (572) about the relative rotation axes (81, 82) determine the movement of the third arm (573) and thus of the sixth member (56) between the first retracted position (AR) and the second advanced position (AV).

For example, the rotation of the first arm (571) and the rotation of the second arm (572) in an anticlockwise rotation direction, looking at the figures, determines the displacement of the third arm (573) towards the receiving station (R), and therefore the movement of the sixth member (56) from the first retracted position (AR) to the second advanced position (AV).

Vice versa, the rotation of the first arm (571) and the second arm (572) in a clockwise rotation direction, observing the figures, determines the displacement of the third arm (573) away from the receiving station (R), and then towards the lowered position (A) in which the tubular box is opened-out, and then the movement of the sixth member (56) from the second advanced position (AV) to the first retracted position (AV).

In a further preferred aspect, the movement system (57) of the sixth member further comprises a lever mechanism (90) for activation in rotation of the sixth member (56) about the eleventh rotation axis (85) with respect to the third arm (573).

In this way, the sixth member (56) can be rotated to orientate the third suction means (560) into an optimal position such as to be able to abut, and retain by suction, a wall of the opened-out tubular box, and then to rotate the opened-out tubular box in order to orientate the box in a more appropriate orientation for release thereof in the receiving station, for example between the elongate elements (4) of the chain conveyor means (3).

In the preferred embodiment illustrated in the figures of the drawings, the lever mechanism (90) can be configured in such a way as to comprise: a first lever (91) which is hinged to the frame (50) at a rotation axis (910) coinciding with the seventh rotation axis (81) of hinging of the first arm (571) to the frame (50); a second lever (92) which is hinged, at a first end (921), to the first lever (91), and which is hinged, at a second end (922), to the first end portion (573A) of the third arm (573); a third lever (93) which is hinged, at a first end (931), to the first end portion (573A) of the third arm (573), and which is hinged, at a second end (932), to the sixth member (56).

In further preferred aspects, the second arm (572) of the movement system (57) is hinged to the frame (50) according to an eighth rotation axis (82) which coincides with the second rotation axis (62) hinging the second member (52) to the frame (50), while the first rotation axis (61) of the first member (51), the second rotation axis (62) of the second member (52), the third rotation axis of the third member (53), the seventh rotation axis (81) of the first arm (571) of the movement system (57) and the eighth rotation axis (82) of the second arm (572) of the movement system (57) are parallel to one another and are horizontal.

A further special aspect consists in the fact that the fifth member (55) is activatable in rotation about the sixth rotation axis (66), with respect to the fourth member (54), by means of use of a pair of connecting rods (75, 76), the pair of connecting rods (75 76) being arranged and configured so that a first connecting rod (75) is hinged to the frame (50) according to a rotation axis coinciding with the first rotation axis (61), and a second connecting rod (76) is hinged, at a first end, to the first connecting rod (75) and, at a second end, to the fifth member (55) (see for example FIG. 2).

The activation in rotation of the first connecting rod (75) about the relative rotation axis determines the displacement of the second connecting rod (76) and thus the rotation of the fifth member (55) with respect to the fourth member (54), which enables the fifth member (55) to bring the second suction means (550) to strike the second wall (9) of the first sheet (6) of the tubular box (2) in the flattened configuration, which is maintained in the lowered position (A) by means of the first member (51), and thus rotate the second wall (9) with respect to the first wall (8), realising the opening out of the tubular box (2) (FIG. 5).

The invention claimed is:

1. An apparatus for collecting a tubular box in a flattened configuration from a store, for opening out the tubular box and for transferring the opened-out tubular box to a receiving station, the tubular box in the flattened configuration comprising a first sheet and a second sheet which are in contact with one another or very close to one another, the first sheet being connected to the second sheet at two common and opposite ends, the first sheet being provided with a first wall and a second wall which are separated from one another by a first fold line;

the apparatus comprising:

a frame;

a first member, provided with a first suction means, which is hinged to the frame according to a first rotation axis, in a position below an outlet of the store;

a second member which is hinged to the frame at a second rotation axis;

a third member which is hinged to the frame at a third rotation axis, coinciding with the first rotation axis of the first member;

a fourth member which is hinged, by a first end portion, to the second member at a fourth rotation axis and which is hinged, at an intermediate portion, to the third member at a fifth rotation axis;

a fifth member, provided with a second suction means, which is hinged to a second end portion of the fourth member at a sixth rotation axis, so as to be activatable in rotation about the sixth rotation axis, with respect to the fourth member, wherein the first member is activatable in rotation, in a first rotation direction about the first rotation axis, so as to be positioned in a raised position in such a way that the first suction means can abut the tubular box in flattened configuration at the outlet of the store, and retain the tubular box by suction at the first wall of the first sheet, and thus activatable in rotation in an opposite second rotation direction in order to extract the tubular box in the flattened configuration from the store and in order to bring the tubular box in the flattened configuration into a lowered position facing the receiving station in which the tubular box in the flattened configuration is retained by the first suction means;

wherein the fifth member is positionable in a position such that the second suction means are situated upstream of the first suction means of the first member, with respect to the receiving station, when the first member brings the tubular box in the flattened configuration into the lowered position, and inferiorly of the tubular box in the flattened configuration, and wherein the fifth member, when the tubular box is in the flattened configuration has been brought into the lowered position, and retained by the first suction means of the first member, is activatable in rotation about the sixth rotation axis, with respect to the fourth member, in such a way as to bring the second suction means to strike, and retain, by suction, the second wall of the first sheet of the tubular box and rotate the second wall with respect to the first wall about the relative fold line, for opening out the tubular box, with the fifth member which is configured to retain via the second suction means the opened-out tubular box following the deactivation of the first suction means and a rotation of the first member in order to disengage from the opened-out tubular box;

further comprising a sixth member, provided with a third suction means, and a movement system of the sixth member, wherein the movement system is configured and predisposed in such a way as to move and position the sixth member in a first retracted position, in proximity of the lowered position, at which the third suction means can abut, and retain, by suction, a wall of the opened-out tubular box which is retained by the second suction means of the fifth member following the deactivation of the first suction means and the disengagement of the first member from the tubular box, wherein the movement system which is also configured and predisposed, following the deactivation of the second suction means and the disengagement of the fifth member from the opened-out tubular box, to move and position the sixth member, with the third suction means which retain by suction the opened-out tubular box, into a second advanced position at the receiving station so that the opened-out tubular box can be transferred to and released in the receiving station following the deactivation of the third suction means.

2. The apparatus of claim 1, wherein the movement system of the sixth member comprises:

a first arm which is hinged to the frame according to a seventh rotation axis;

a second arm which is hinged to the frame according to an eighth rotation axis;

a third arm which is conformed in such a way as to comprise a first end portion, a second intermediate portion and a third end portion, wherein the third arm is hinged, with the first end portion thereof, to the first arm according to a ninth rotation axis and is hinged with the second intermediate portion to the second arm according to a tenth rotation axis, with the sixth member which is hinged to the third end portion of the third arm at an eleventh rotation axis, with the rotation of the first arm and the second arm about the relative rotation axes which determine the movement of the third arm and thus of the sixth member between the first retracted position and the second advanced position.

3. The apparatus of claim 2, wherein the movement system of the sixth member further comprises a lever mechanism for activation in rotation of the sixth member about the eleventh rotation axis with respect to the third arm.

4. The apparatus of claim 3, wherein the lever mechanism is configured in such a way as to comprise:

a first lever which is hinged to the frame at a rotation axis coinciding with the seventh rotation axis of hinging of the first arm to the frame;

a second lever which is hinged, at a first end, to the first lever, and which is hinged, at a second end, to the first end portion of the third arm, a third lever which is hinged, at a first end, to the first end portion of the third arm, and which is hinged, at a second end, to the sixth member.

5. The apparatus of claim 2, wherein the second arm of the movement system is hinged to the frame according to the eighth rotation axis which coincides with the second rotation axis hinging the second member to the frame, and wherein the first rotation axis of the first member, the second rotation axis of the second member, the third rotation axis of the third member, the seventh rotation axis of the first arm of the movement system and the eighth rotation axis of the second arm of the movement system are parallel to one another and are horizontal.

6. The apparatus of claim 1, wherein the fifth member is activatable in rotation about the sixth rotation axis, with respect to the fourth member, by means of a pair of connecting rods which is arranged and configured so that a first connecting rod is hinged to the frame according to a rotation axis coinciding with the first rotation axis, and a second connecting rod is hinged, at a first end, to the first connecting rod and, at a second end, to the fifth member.

* * * * *